(12) United States Patent
Tharp et al.

(10) Patent No.: US 8,813,563 B2
(45) Date of Patent: Aug. 26, 2014

(54) MEASURING CUP

(75) Inventors: Bruce Mitchell Tharp, Chicago, IL (US); Stephanie M. Tharp, Chicago, IL (US)

(73) Assignee: Evriholder Products LLC, Anaheim, CA (US)

( * ) Notice: Subject to any disclaimer, the term of this patent is extended or adjusted under 35 U.S.C. 154(b) by 0 days.

(21) Appl. No.: 13/531,331

(22) Filed: Jun. 22, 2012

(65) Prior Publication Data

US 2012/0324997 A1    Dec. 27, 2012

Related U.S. Application Data

(60) Provisional application No. 61/500,015, filed on Jun. 22, 2011.

(51) Int. Cl.
*G01F 19/00* (2006.01)
*G01F 25/00* (2006.01)

(52) U.S. Cl.
USPC ........... 73/427; 73/426; 73/1.73; 141/331

(58) Field of Classification Search
USPC ............... 73/427, 426, 1.73; 141/331
See application file for complete search history.

(56) References Cited

U.S. PATENT DOCUMENTS

| | | | | |
|---|---|---|---|---|
| 2,736,469 A * | 2/1956 | Stone | ............................ | 222/529 |
| 4,416,381 A * | 11/1983 | Swartwout | ..................... | 215/228 |
| 4,981,144 A * | 1/1991 | Carels, Jr. | ..................... | 600/573 |
| 5,551,606 A * | 9/1996 | Rai et al. | ...................... | 222/460 |
| 5,662,249 A * | 9/1997 | Grosse | .......................... | 222/461 |
| 8,100,008 B2 * | 1/2012 | Mentesh | ........................ | 73/427 |
| 2012/0097556 A1 * | 4/2012 | Gascoine | ..................... | 206/216 |

* cited by examiner

*Primary Examiner* — Lisa Caputo
*Assistant Examiner* — Jamel Williams

(57) ABSTRACT

A measuring cup and funnel system includes a measuring cup and a funnel portion formed within the measuring cup. The measuring cup includes measurement indicators based on volume within an interior of the measuring cup considering displacement of the funnel portion.

16 Claims, 7 Drawing Sheets

MEASURING CUP

This application claims priority from U.S. provisional patent application Ser. No. 61/500,015, filed Jun. 22, 2011, incorporated herein by reference.

BACKGROUND

1. Field

The embodiments relate to measuring cups, and in particular to measuring cups with integrated funnels.

2. Description of the Related Art

Measuring cups and funnels are used in a variety of tasks. Many times both measuring cup and funnel are needed for a task, for example, involving cooking or baking. The funnel and measuring cup each take up storage space and counter space, and require a user to obtain the funnel and measuring cup, and then store the measuring cup and funnel after use.

SUMMARY

One embodiment of the invention includes an apparatus including a measuring cup portion and a funnel portion integrated with the measuring cup portion. The measuring cup portion includes measurement indicators based on volume within the measuring cup portion.

Another embodiment of the invention includes a measuring cup and funnel system. The system includes a measuring cup and a funnel portion formed within the measuring cup. The measuring cup includes measurement indicators based on volume within an interior of the measuring cup considering displacement of the funnel portion.

Other aspects and advantages of the present invention will become apparent from the following detailed description, which, when taken in conjunction with the drawings, illustrate by way of example the principles of the invention.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of measuring cups integrated with funnels, as well as operation and/or component parts thereof. While the following description will be described in terms of measuring cups integrated with a funnel device systems and devices for clarity and to place the invention in context, it should be kept in mind that the teachings herein may have broad application to all types of systems, devices and applications.

One embodiment of the invention provides a measuring cup and funnel system including a measuring cup and a funnel portion formed within the measuring cup. The measuring cup includes measurement indicators based on volume within an interior of the measuring cup considering displacement of the funnel portion.

Figure 1:
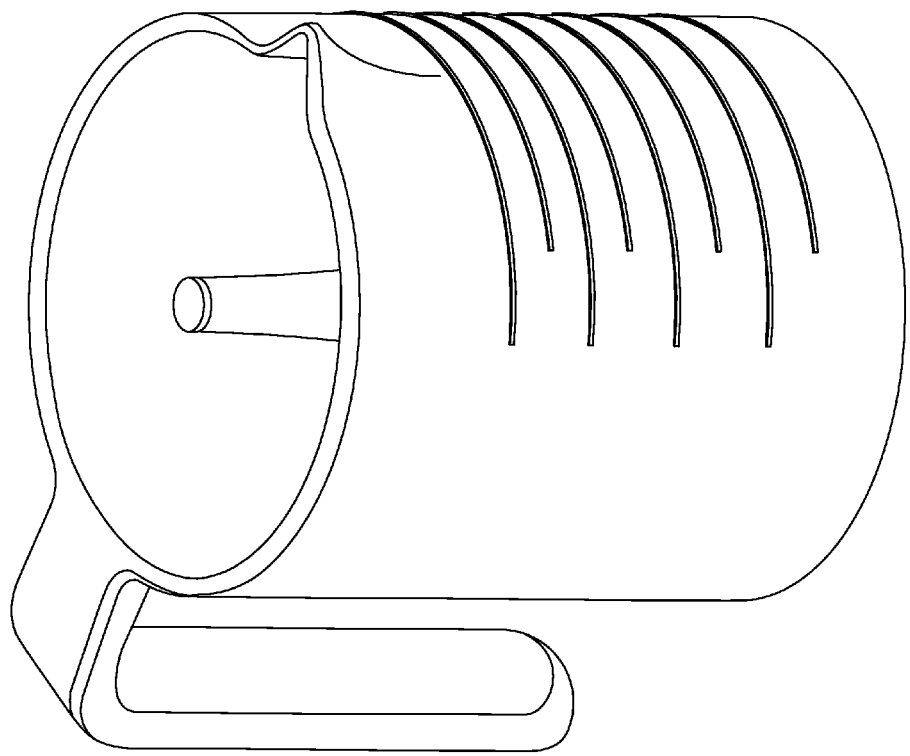
FIG. 1 illustrates a perspective view of an integrated measuring cup and funnel system shown in an upright state according to one embodiment of the invention.

FIG. 1 illustrates a perspective view of a measuring cup 100 shown in the "measuring cup" upright position according to one embodiment of the invention. The measuring cup 100 includes a vessel rim portion 1, a base inversion or funnel portion 3, a plug 7, measurement indicators 120 and a pouring spout 125. In one embodiment of the invention, the measuring cup 100 includes a handle 110. In one example, the handle 110 includes a groove 115 for positioning a user's thumb for an ergonomical fit. In other embodiments, the handle is optional.

In one example, the plug is placed in a narrow funnel opening for preventing liquid or other material (e.g., flour, sugar, etc.) from entering the funnel portion 3 when the measuring cup 100 is in an upright position.

In one embodiment of the invention, the measurement indicators 120 take into consideration the displaced volume that the funnel portion 3 causes to the interior of the measuring cup 100. Since the total volume within the measuring cup 100 is equal to the volume of the measuring cup (without the funnel portion) minus the displacement volume of the funnel portion 3, the measurement indicators are offset from where standard measuring cup indicators would be placed. In one example, the measurement indicators 120 may be etched, inked, added via laser, painted, etc. In other examples, the measurement indicators may be raised (from the exterior of the measuring cup 100) or indented. In some examples, the measurement indicators include written measurement levels (e.g., ¼ cup, ½ cup, ¾ cup, 1 cup, etc.). In other examples, the written measurement levels may be raised, indented or include Braille indicators for users with poor or loss of vision.

Figure 2:
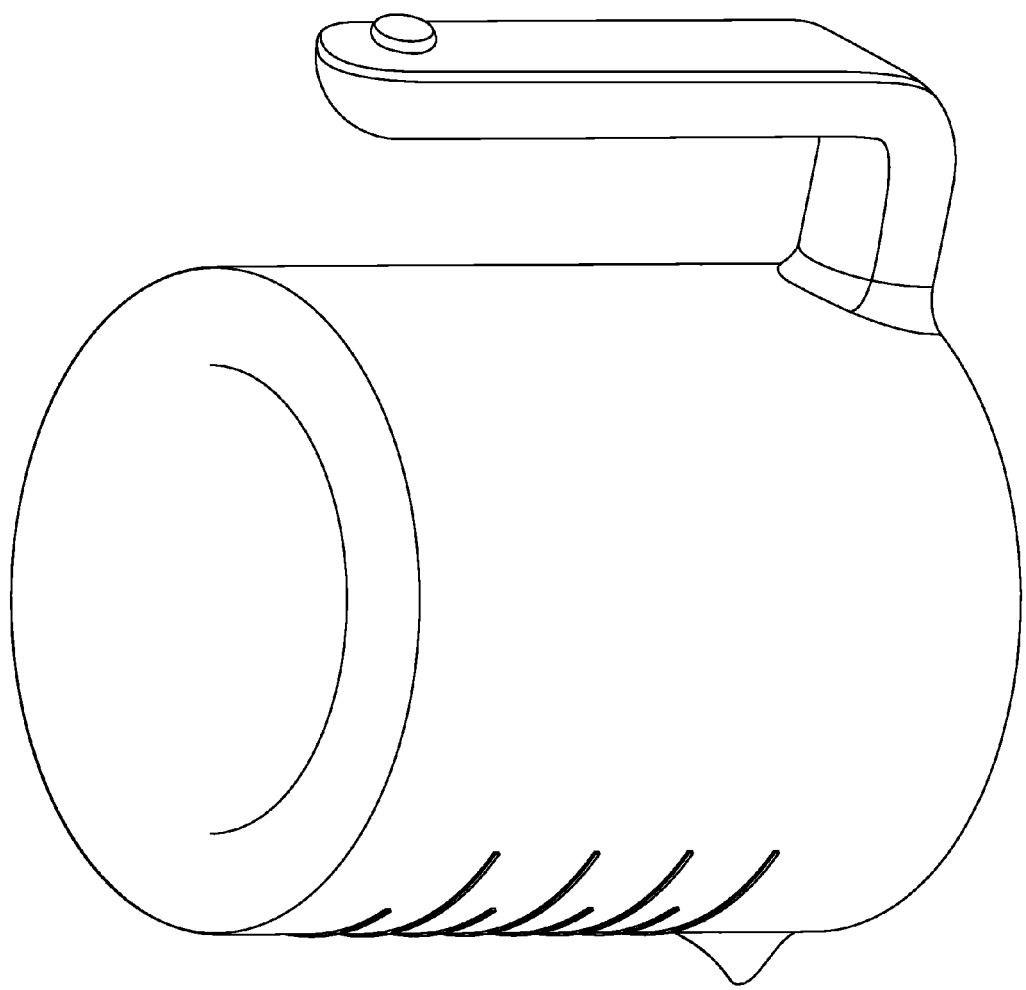
FIG. 2 illustrates a perspective view of an integrated measuring cup and funnel system shown in an upside-down state according to one embodiment of the invention.

FIG. 2 illustrates the measuring cup 100 shown in an upside-down or funnel position. As shown, the measuring cup 100 includes a bottom rim portion 11, wide funnel end opening 4. In one embodiment of the invention, the plug 7 fits within an opening or void within the handle 110. It should be noted that in other embodiments of the invention, the plug may be placed in other openings or voids, such as other portions of the handle or portions of the measuring cup 100 (see, e.g., FIG. 7).

Figure 3:
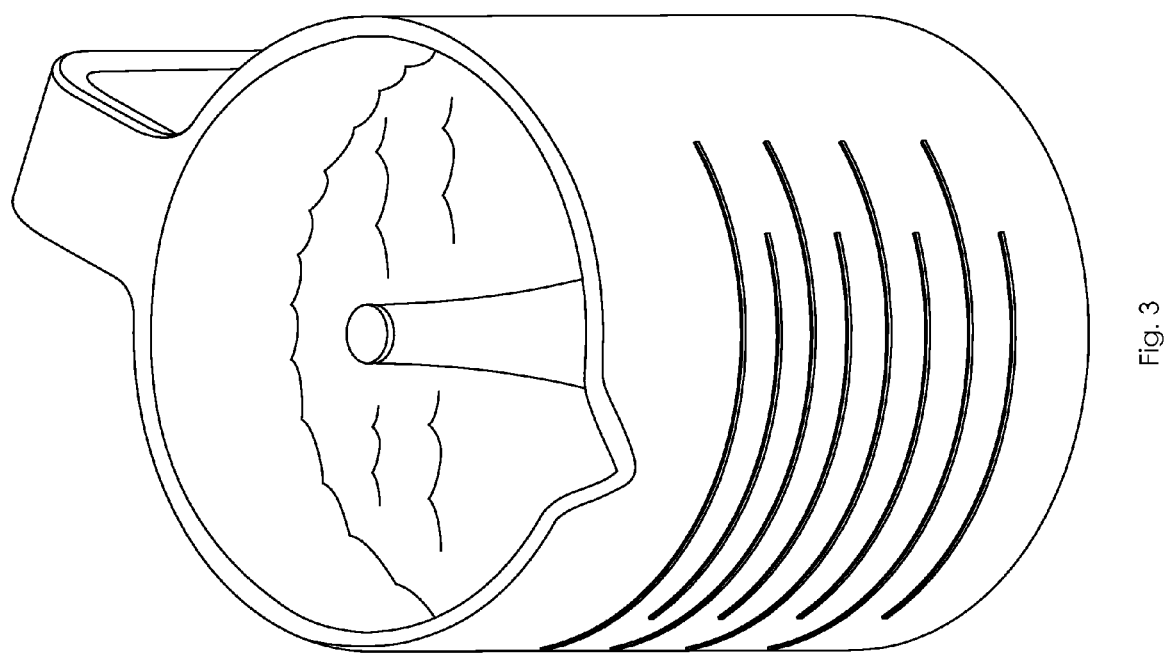
FIG. 3 illustrates a perspective view of an integrated measuring cup and funnel system shown in an upright state and filled with a liquid according to one embodiment of the invention.

FIG. 3 illustrates the measuring cup 100 shown filled with a liquid in the upright position.

Figure 4:
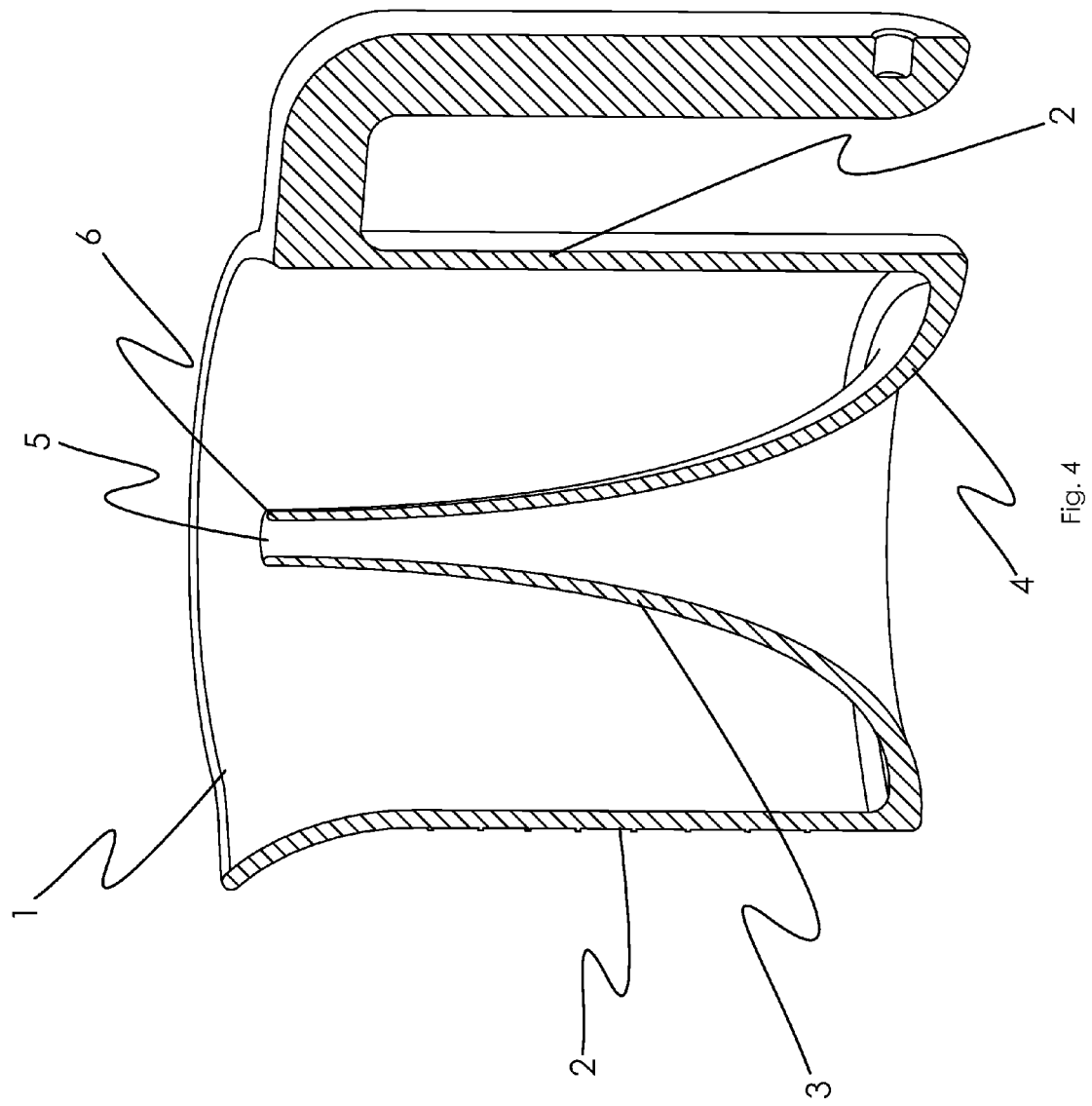
FIG. 4 illustrates a cross-sectional view of the an integrated measuring cup and funnel system shown in an upright state according to one embodiment of the invention.

FIG. 4 shows a cross-section, perspective view of the measuring cup 100 shown in the measuring cup or upright position. As illustrated, the measuring cup 100 includes the vessel rim portion 1, vessel walls 2, funnel or base inversion 3, funnel wide opening end 4, funnel narrow opening end 5, and a funnel narrow rim portion 6. In one embodiment of the invention, the handle 110 has a same height as the height of the measuring cup 100 measured form the base/bottom rim portion 11 to the vessel rim portion 1. In other embodiments of the invention, the handle has a height less than the height of the measuring cup.

Figure 5:
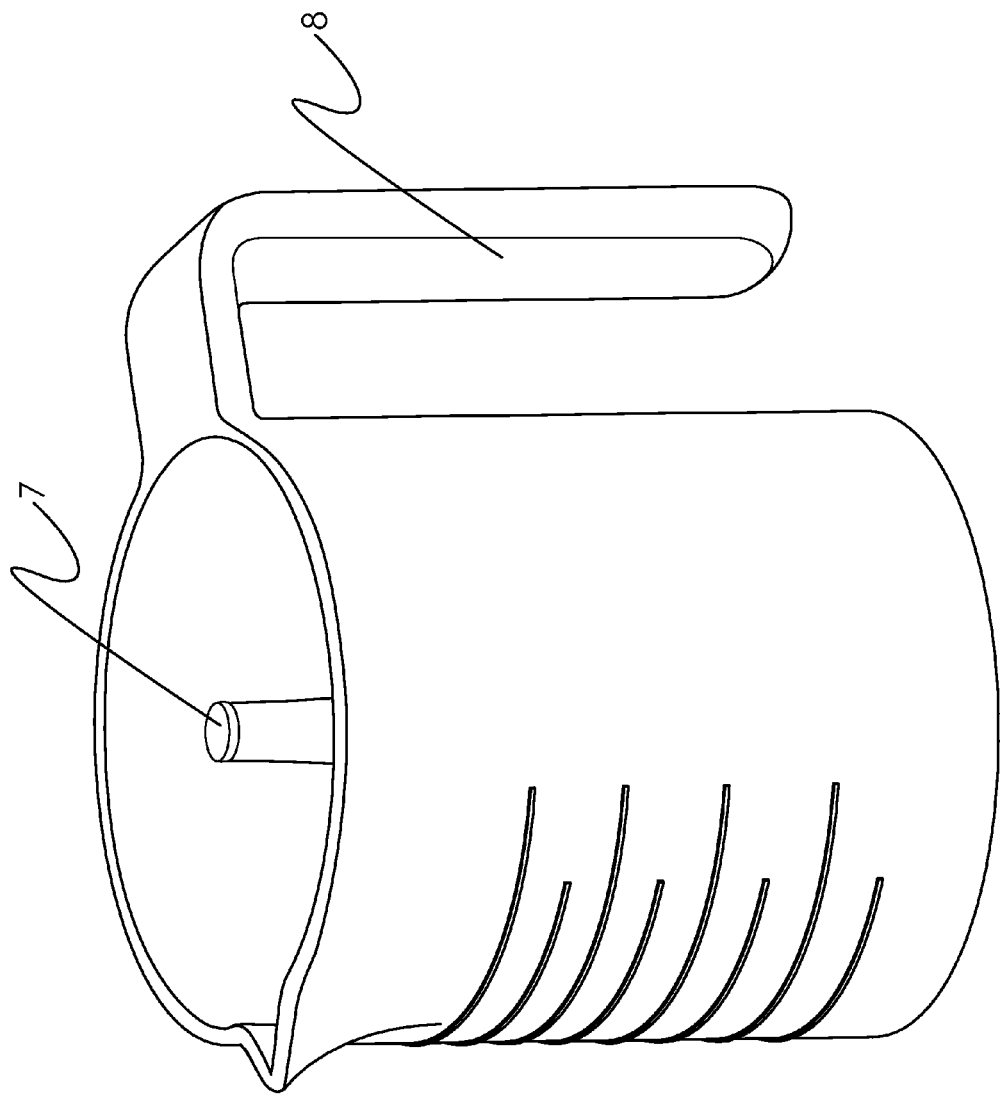
FIG. 5 illustrates a perspective view of an integrated measuring cup and funnel system shown in an upright state according to one embodiment of the invention.

FIG. 5 shows a perspective view an embodiment of the invention shown with the funnel plug 7 placed into the funnel narrow opening end 5. In one embodiment of the invention, the measuring cup is formed via injection molding. In other embodiments of the invention, the measuring cup 100 may be formed from extrusion, glass molding, etc.

Figure 6:
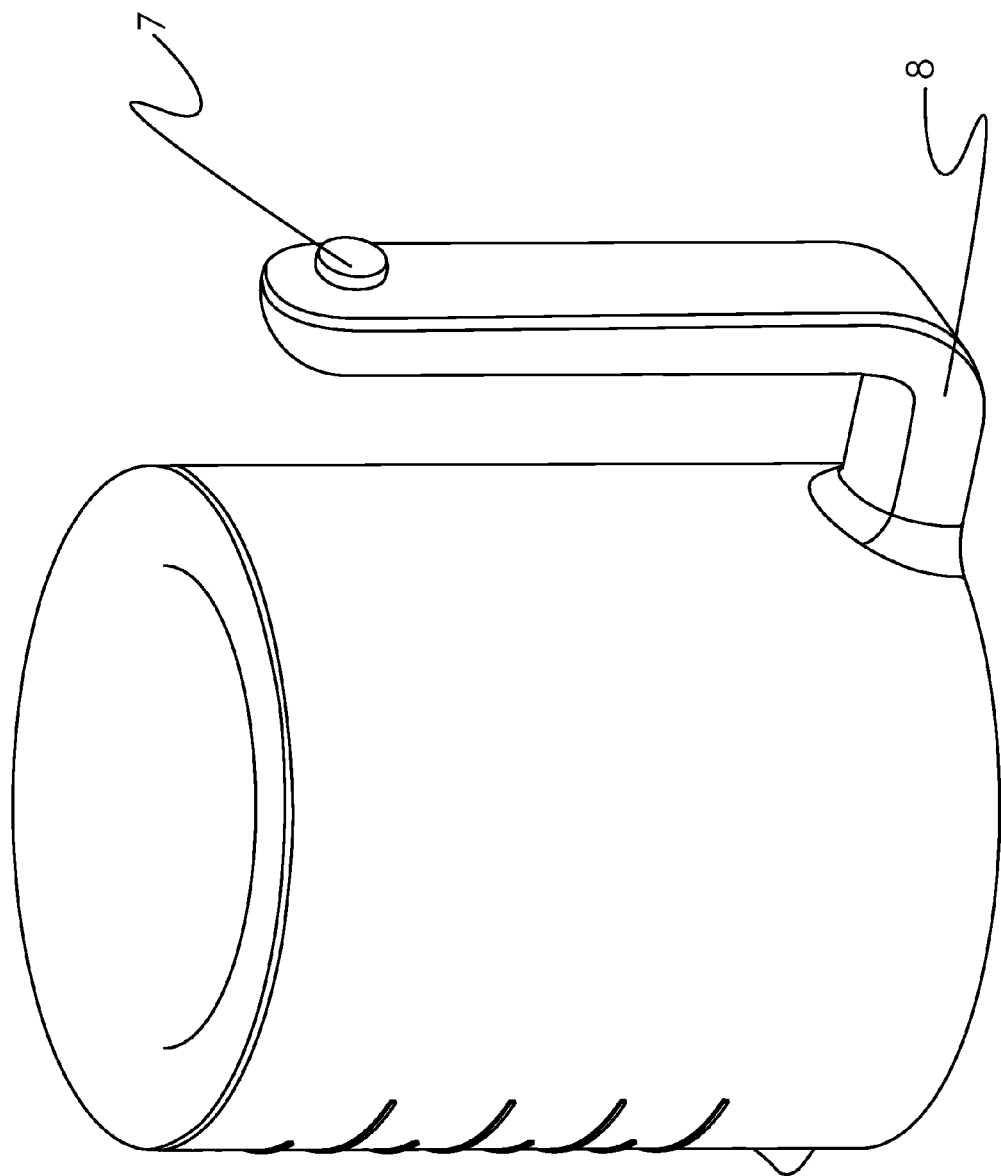
FIG. 6 illustrates a perspective view of the integrated measuring cup and funnel system of FIG. 5 shown in an upside-down state according to one embodiment of the invention.

FIG. 6 shows a perspective view of the measuring cup 100 shown in the funnel or upside-down position. In one example, the funnel plug 7 is stored in a void/opening 615 in the handle 110. As shown, the measuring cup 100 includes a measuring vessel that has a bottom surface and walls 2 that allow for the containment of liquids and solid material. In one example, the portion of the bottom surface that inverts upward into the containment region and narrows toward the height of the vessel rim portion 1. The uppermost portion of this base inversion of funnel portion 3 comprises a funnel narrow opening 5 and funnel narrow rim 6, such that when the measuring cup 100 is in the funnel position, the formed funnel may be used for funneling material or liquid into another container. In the funnel position, liquid may be poured into the funnel wide opening end 4, which will flow through the funnel portion 3 and out of the funnel narrow opening end 5.

In one embodiment of the invention, when liquid is poured into the measuring cup 100 when in the measuring cup position, the funnel plug 7 placed within the funnel narrow opening end 5 prevents any liquid from entering the funnel narrow opening end 5 and flowing through the funnel portion 3, for preventing spills. The funnel plug 7 may be removed when using the invention as a funnel in the funnel position. The funnel plug 7 may be stored within the handle as shown in FIG. 6.

In one example, the measuring cup 100 may be made of one or more of: injection-molded plastic, glass, polycarbonate, reinforced polypropylene, polypropylene, high-density polyethylene, nylon material, hardened plastic, polymer, rubber, composite material, metal or metal alloy, etc., or other similar materials. In some examples the measuring cup 100 may be clear or translucent. In other examples, the measuring cup 100 may be opaque and include internal measurement indicators (not shown).

In one example, the measuring cup 100 placed in the funnel or upside-down position provides an additional benefit of being placed over another container that material or liquid is being funneled into. This prevents spilling and also provides additional control when funneling. Additionally, the funnel may be placed over another container for hands-free funneling. The handle 110 also provides added control when using the measuring cup 100 as a funnel.

As shown in the figures, the measurement cup 100 provides a combined measuring cup/funnel and doesn't take up the additional space that separate funnel and measuring cups would otherwise need. With an easy flip and fill design, the measuring cup 100 provides multi-purposes and ease of use.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Figure 7:
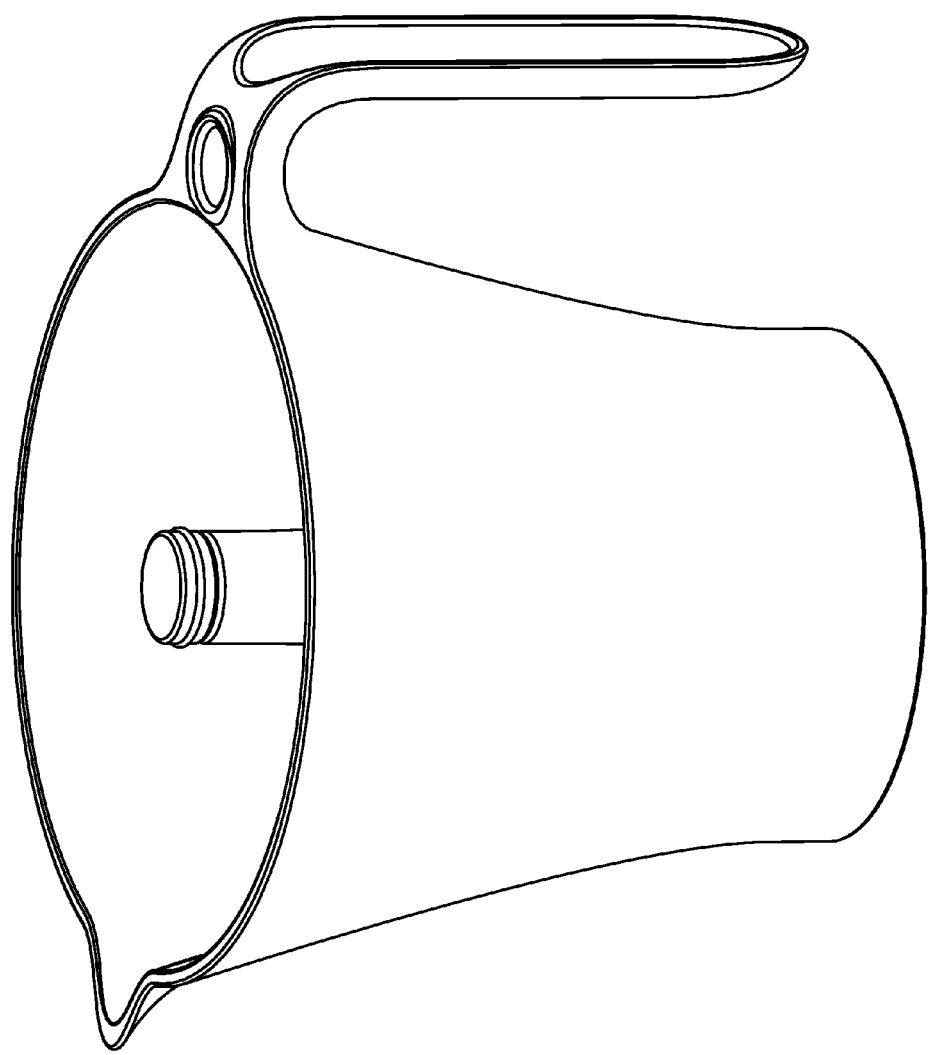
FIG. 7 illustrates a perspective view of another embodiment of an integrated measuring cup and funnel system.

FIG. 7 illustrates a perspective view of another embodiment of the invention shown in an upright state with the funnel inverted.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
a measuring cup portion, and
a funnel portion integrated with the measuring cup portion, wherein the measuring cup portion includes measurement indicators based on volume within the measuring cup portion, wherein the funnel portion is inverted upon the measuring cup portion being in an upright position.

2. The apparatus of claim 1, further comprising a removable plug for sealing one end of the funnel portion.

3. The apparatus of claim 2, further comprising a handle coupled to the measuring cup portion.

4. The apparatus of claim 3, wherein the plug is removably coupled to an opening on the handle.

5. The apparatus of claim 3, wherein the handle has a length equal to a height of the measuring cup portion.

6. The apparatus of claim 3, wherein the handle has a length less than a height of the measuring cup portion.

7. The apparatus of claim 1, wherein the measurement indicators are based on the volume within the measuring cup taking into consideration of an offset volume from the funnel portion.

8. The apparatus of claim 1, wherein a bottom of the measuring cup portion includes a funnel pouring portion.

9. A measuring cup and funnel system comprising:
a measuring cup; and
a funnel portion formed within the measuring cup, wherein the measuring cup includes measurement indicators based on volume within an interior of the measuring cup considering displacement of the funnel portion.

10. The system of claim 9, further comprising a removable plug for sealing a narrow end of the funnel portion.

11. The system of claim 10, further comprising a handle formed on the measuring cup.

12. The system of claim 11, wherein the plug is removably coupled to an opening on the handle.

13. The system of claim 11, wherein the handle has a length equal to a height of the measuring cup.

14. The system of claim 11, wherein the handle has a length less than a height of the measuring cup.

15. The system of claim 9, wherein a bottom of the measuring cup includes a funnel pouring portion including a wide opening end of the funnel portion.

16. The system of claim 9, wherein the funnel portion is inverted upon the measuring cup positioned in an upright position.

\* \* \* \* \*